3,408,919
METHOD FOR FREEZING COFFEE EXTRACT
Herbert Guggenheim, Tenafly, N.J., assignor to General Foods Corporation, White Plains, N.Y., a corporation of Delaware
No Drawing. Filed Feb. 4, 1965, Ser. No. 430,492
4 Claims. (Cl. 99—192)

ABSTRACT OF THE DISCLOSURE

An improved method for obtaining release of coffee extract frozen at relatively mild temperatures (−20° F. or above) from a freezing surface, such as a belt or tray, by sub-cooling the extract to a lower temperature, at least −30° F. with flexing of said surface or, in the alternative, simply by cooling to below −60° F. without the need for flexing.

---

This invention relates to an improvement in the art of freezing coffee extract and, more particularly, to an improvement in the art of slowly freezing coffee extract.

When freeze-drying coffee, it is necessary to cool the roasted extract to below the eutectic temperature of the coffee in order to completely freeze the extract. Since freeze-dried coffee has a tendency to be light brown or tan in color when fast-frozen over a period of several seconds to 10 minutes at freezing temperatures of below −20° F., say −60° F. to −120° F., it has become desirable to freeze the extract over an extended period of time at milder freezing temperatures (above −20° F.) in order to provide an ice structure which, when sublimed, assures a dried coffee which is dark and more coffee-like in color. In freezing coffee extract in this manner, it has become necessary to hold the charge of liquid coffee extract on a tray, belt, or other retaining means while freezing the extract under controlled temperature conditions. Because of the mild temperatures employed the surface of the belt or tray which is used to retain the frozen extract during freezing is found to stick or adhere to the frozen extract and presents a serious processing problem in removing the frozen extract from the retaining surface. This adhesion problem is present in all metals having a high thermal conductivity, such as steel or aluminum, and is also present in many plastics. Since a clean separation of extract from the tray, belt, or other retaining means, is essential to assure an efficient freezing process, various suggestions have been made to eliminate this problem. Use of non-adhesive waxes have been discouraged due to the danger of introducing foreign material into the extract. The use of non-adhesive rubber, plastic or fabric type belts or trays as the retaining means has presented processing difficulties (fissuring and cracking) at the low temperatures employed. Also, these types of belts or coatings are undesirable since they present possible toxicity problems.

It would, therefore, be desirable if a simple method were devised to avoid the adhesion problem of coffee extract which has been frozen at mild temperatures.

This invention is founded on the discovery that separation of coffee extract which has been frozen to a retaining surface at mild freezing temperatures may be facilitated by a process which comprises applying a body of liquid coffee extract to said retaining surface, cooling said extract from its ice point to below its eutectic point at freezing temperatures of above −20° F. to thereby completely freeze all the water in said extract, further cooling said extract to a temperature below −30° F., and then flexing said retaining surface to obtain release of the frozen coffee extract.

Preferably, the extract is cooled from its ice point to below its eutectic point over a period of at least 15 minutes, say 30 to 45 minutes in order to assure a darker, more coffee-like color in the final dried product.

As used in this specification, "ice point" means that temperature at which water present in the coffee extract begins to freeze in the form of ice crystals. The ice point for coffee extract will vary depending on the concentration. However, for 25% to 30% soluble solids the ice point is usually about 28° F. "Eutectic point" as used herein is the temperature at which that composition of coffee extract having the lowest melting point of any other composition in the coffee extract, freezes. The eutectic point for coffee extract is usually between −10° F. and −13.5° F. At this temperature, a eutectic mixture of coffee solids (soluble and insoluble) coffee aromatics and water freezes into a solid state. Once this point is reached, the extract can be considered to be completely frozen.

Specifically, the advantages of this invention can be achieved whenever coffee extract is frozen at above −20° F. to a retaining surface used to hold the liquid extract in the desired shape during freezing. The retaining surface may take the form of a freezing tray, freezing belt, or other type of receptacle which serves to hold the liquid charge of coffee while freezing it. The retaining surface may be of metal or plastic, usually it is made of stainless steel or aluminum since these metals have a high thermal conductivity.

Freezing may be accomplished by contacting the retaining means holding the charge of liquid coffee with refrigerant or cold brine, the refrigerant transmitting its temperature to the liquid extract through the retaining means and thereby cooling the extract to below its eutectic point. Alternatively, the charge of liquid extract may be frozen by the use of a freezing room having ambient temperature conditions sufficiently low to completely freeze the extract. Whatever the particular manner of freezing employed, a sticking or adhesion problem will be presented when the extract is frozen at product temperatures of above −20° F. In order to facilitate separation of the frozen extract from the retaining surface, it will be necessary to further cool the extract to at least −30° F. or below and then flex the retaining surface to obtain release of the frozen extract. Preferably, the extract is further cooled to −50° F. or below and then the retaining means is flexed. If the extract is cooled sufficiently low, −60° F. or below, little or no flexing of the belt or retaining means is necessary to obtain release.

This invention will now be described by reference to the following specific examples.

Example 1

Coffee extract having a soluble solids concentration of about 27% and a product temperature of about 35° F. was applied to the upper surface of a freezing belt about 1–3 feet from the starting end of the belt. The freezing belt was made of stainless steel 2 feet wide and was operated by 2 pulleys located about 60 feet apart. The belt was adapted to move through a freezing zone over a total period of 60 minutes. The extract was frozen by contacting the steel belt with 3 cooling tanks containing cold brine. These tanks were located on the underside of the freezing belt. Three tanks were used, each 20 feet long, the first tank having a temperature of 20° F., the second tank having a temperature of −20° F. and the third tank a temperature of −40° F.

The initial one-third of the belt using a 20° F. brine solution for a coolant had a contact time of about 20 minutes. The second one-third of the belt, employing a −20° F. brine solution, had a contact time of 20 minutes. The final one-third of the freezing belt also had a contact time of 20 minutes, but the coolant had a temperature of —40° F. The coffee layer was applied at a thickness of about ½" and the liquid extract was retained on the freezing belt by rubber side members operated by terminal pulleys at opposite ends of the belt. The side members moved at the same rate as the freezing belt.

A second freezing belt was used as a control. The control belt employed three brine tanks having a 20° F. temperature for the first brine tank and —20° F. temperature for the second and third brine tanks. Total freezing time was 60 minutes and contact time with each brine tank was 20 minutes.

The frozen extract, having a product temperature of between 35° and 40° F., was found to release quite easily in the form of slabs from the —40° F. cooled belt surface as the belt curved around its terminal pulley with only slight sticking of the frozen extract to the freezing surface.

The control sample, frozen to the —20° F. cooled belt surface, experienced serious stickage problems and severe breakage of the frozen extract as it was separated from the freezing surface.

The final product when ground and freeze-dried according to this procedure, had a dark, coffee-like color.

Example 2

The procedure of Example 1 was followed with the exception that the third brine tank employed brine solution having a temperature of —60° F. The control sample was kept the same.

The frozen extract having a product temperature of between 55° and 60° F. at the terminal portion of the freezing belt was found to release easily and cleanly from the freezing belt. Release of the frozen extract was easily accomplished without flexing the belt by merely breaking the frozen extract in the form of 3' x 2' x ½" slabs before the belt curved around its terminal pulley.

The control sample was very difficult to separate from the freezing surface before it curved around the terminal pulley. Separation of frozen extract was achieved only at the expense of severe breakage of the slabs due to sticking of extract to the freezing surface of the belt.

While this invention has been described by reference to specific examples, it is understood to be limited only by the appended claims.

What is claimed is:

1. A process for facilitating separation of coffee extract which has been frozen to a retaining surface at mild temperatures which comprises applying a body of liquid coffee extract to said retaining surface, cooling said extract from its ice point to below its eutectic point over a period of at least 15 minutes at freezing temperatures of above —20° F. to thereby completely freeze all the water in said extract and assure a more coffee-like color in said frozen coffee, further cooling said extract to a product temperature of below at least —50° F. and flexing said retaining surface to obtain release of the frozen extract.

2. The process of claim 1 wherein the retaining surface is in the form of a metal freezing belt which holds the liquid coffee extract in the form of a slab while said extract is frozen.

3. A process for facilitating separation of coffee extract which has been frozen to a retaining surface at mild temperatures which comprises applying a body of liquid coffee extract to said retaining surface, cooling said extract from its ice point to below its eutectic point over a period of at least 15 minutes at freezing temperatures of above —20° F. to thereby completely freeze all the water in said extract and assure a more coffee-like color in said frozen coffee, further cooling said extract to a product temperature of below at least —60° F. and removing said frozen extract from the retaining surface.

4. The process of claim 3 wherein the retaining surface is in the form of a metal freezing belt which holds the liquid coffee extract in the form of a slab while said extract is frozen.

References Cited

UNITED STATES PATENTS

| 3,253,420 | 5/1966 | De George | 99—199 X |
| 3,287,926 | 11/1966 | Hall | 62—71 |

MAURICE W. GREENSTEIN, *Primary Examiner.*